US006604360B1

United States Patent
Vuk

(10) Patent No.: US 6,604,360 B1
(45) Date of Patent: Aug. 12, 2003

(54) EXHAUST DRIVEN ENGINE COOLING SYSTEM

(75) Inventor: Carl Thomas Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/125,127

(22) Filed: Apr. 18, 2002

(51) Int. Cl.[7] .............................................. F02B 33/44
(52) U.S. Cl. ..................... 60/597; 60/608; 123/41.11; 123/41.12
(58) Field of Search ................ 60/597, 608; 123/41.11, 123/41.12, 41.31

(56) References Cited

U.S. PATENT DOCUMENTS

| | | | |
|---|---|---|---|
| 1,277,735 A | * | 9/1918 | La Porte ...................... 60/597 |
| 3,853,098 A | * | 12/1974 | Ishikawa et al. .......... 123/41.11 |
| 4,362,131 A | * | 12/1982 | Mason et al. ............. 123/41.31 |
| 4,665,704 A | | 5/1987 | Hartwig ........................ 60/597 |
| 4,694,654 A | | 9/1987 | Kawamura .................... 60/597 |
| 4,729,225 A | | 3/1988 | Bucher ......................... 60/608 |
| 4,745,754 A | | 5/1988 | Kawamura .................... 60/608 |
| 4,756,377 A | | 7/1988 | Kawamura et al. ........... 60/597 |
| 4,774,811 A | | 10/1988 | Kawamura .................... 60/608 |
| 4,798,257 A | | 1/1989 | Kawamura et al. ........... 60/608 |
| 4,885,911 A | | 12/1989 | Woollenweber et al. ...... 60/597 |
| 4,886,978 A | | 12/1989 | Kawamura .................... 60/597 |
| 4,977,862 A | * | 12/1990 | Aihara et al. ............. 123/41.12 |
| 5,079,913 A | | 1/1992 | Kishishita .................... 60/597 |
| 5,138,840 A | * | 8/1992 | Oguchi et al. ................ 60/597 |
| 5,400,596 A | | 3/1995 | Shlien .......................... 60/597 |
| 6,205,786 B1 | | 3/2001 | Hasler ......................... 60/612 |

FOREIGN PATENT DOCUMENTS

JP       63085214 A   *   4/1988   ............. F01P/3/22

* cited by examiner

Primary Examiner—Thomas Denion
Assistant Examiner—Thai-Ba Trieu

(57) ABSTRACT

An energy recovery system for an internal combustion engine includes a turbocharger unit having a turbocharger turbine receiving exhaust from the engine and a second turbine driven by the exhaust gasses. The second turbine drives an electrical generator. The generator supplies electrical power to an electrical control unit, which supplies power to an electric fan motor which drives an engine cooling fan driven by. The control unit also supplies electrical power to an electric coolant pump motor which drives an engine coolant pump. The second turbine is preferably a variable geometry turbine whose geometry is controlled so that its power absorption matches the electrical load of the generator.

16 Claims, 2 Drawing Sheets

EXHAUST DRIVEN ENGINE COOLING SYSTEM

BACKGROUND OF THE INVENTION

The present invention relates to an energy recovery system for recovering and utilizing exhaust energy from an internal combustion engine.

Engine cooling systems consume significant amounts of power. For example, for cost reasons, fixed blade fans are sized for the heaviest cooling load condition. As a result, during light load operation several kilowatts (kW) of engine output power are being wasted. At rated conditions, it is typical for five percent of the engine power to be used to drive the cooling fan, and for 1 to 2 kW to be used to drive the water pump.

Modern turbochargers provide charge air boost pressure by utilizing energy being exhausted from the engine. Considerable unused energy is available from the exhaust gasses because the turbine is normally sized only to provide needed charge air.

SUMMARY

Accordingly, an object of this invention is to provide a system for utilizing exhaust energy of an internal combustion engine which would otherwise be wasted.

A further object of the invention is to use the exhaust energy of an engine to operate cooling system components.

These and other objects are achieved by the present invention, wherein an energy recovery system for an internal combustion engine includes a turbocharger unit having an turbocharger turbine receiving exhaust from the engine and a second turbine driven by the exhaust gasses. The second turbine drives an electrical generator. The generator supplies electrical power to an electrical control unit, which supplies power to an electric fan motor which drives an engine cooling fan. The control unit also supplies electrical power to an electric coolant pump motor which drives an engine coolant pump. The turbine is preferably a variable geometry turbine whose geometry is controlled so that its power absorption matches the electrical load of the generator. The system may also include a turbine bypass valve or wastegate which provides turbine overspeeding.

DETAILED DESCRIPTION

Figure 1:
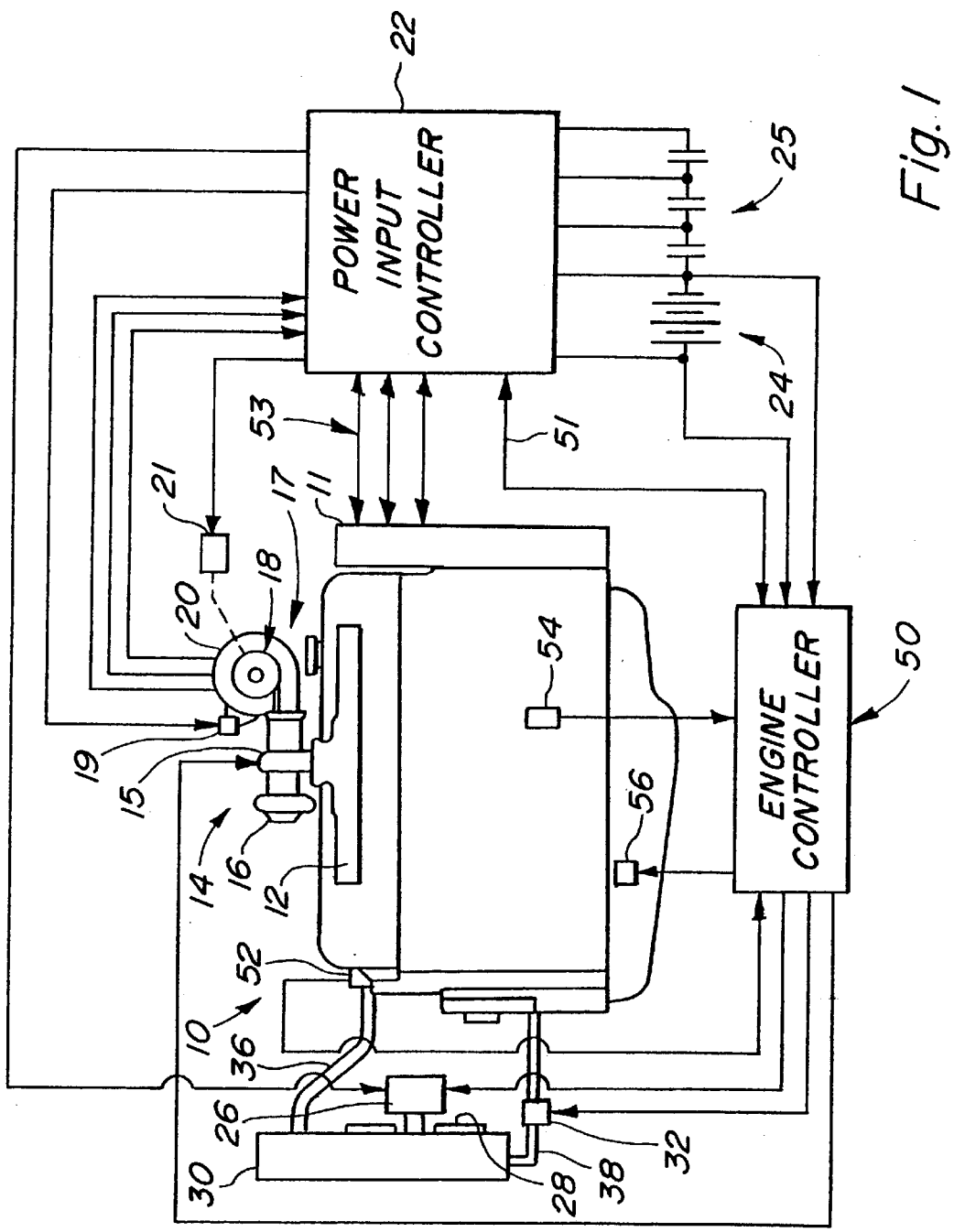
FIG. 1 is a simplified schematic diagram of an exhaust energy recovery system according to the present invention.

Referring to FIG. 1, an engine 10 includes a conventional flywheel motor generator 11 and an exhaust manifold 12. A turbocharger unit 14 has an exhaust driven first stage exhaust turbine 15 which receives exhaust from exhaust manifold 12 and which drives an inlet air compressor 16. A turbo-generator unit 17 includes a variable geometry second stage turbine 18 which is downstream from and which receives exhaust gasses from first stage turbine 15. Turbo-generator unit 17 also includes an electrical generator 20 which is driven by turbine 18. Turbine 18 includes an electric servo-motor actuator 19 which controls the geometry of the turbine 18.

Turbine 18 preferably includes a conventional wastegate (not shown), which prevents the turbine from spinning too fast at high engine speeds. The wastegate includes a valve (not shown) which allows the exhaust to bypass the turbine blades (not shown in FIG. 1) and which is controlled by a wastegate actuator 21.

Generator 20 provides electrical power, preferably 3-phase power at a high voltage such as 300 volts, to dual voltage electrical control unit 22. Control unit 22 supplies electrical power to storage devices such as 42 volt battery 24 or ultra-capacitor 25. Control unit 22 supplies a control signal to the actuator 19 which controls the geometry of the turbine 18 so that the power absorbed by turbine 18 from the exhaust gases matches the electrical load of the generator 20.

Motor generator 11 provides electrical power to and receives electrical power from electrical control unit 22.

Control unit 22 also supplies electrical power to an electric fan motor 26 which drives an engine cooling fan 28 which blows air through a conventional radiator 30. The fan motor 26 may be a low or high voltage motor, such as a 42 volt or 300 volt motor. Control unit 22 also supplies a control signal to the wastegate actuator 21.

Control unit 22 also supplies 42 volt electrical power to an engine control unit 50. Information is communicated between control units 22 and 50 via cable 51. Signals are also exchanged between control unit 22 and flywheel motor generator 11 via cable 53.

An electric coolant pump 32 circulates coolant through the radiator 30 and the engine 10 via coolant lines 36 and 38. The integral motor (not shown) of pump 32 is preferably a low voltage motor, such as a 42 volt motor. Control unit 50 supplies controlled 42 volt electrical power the coolant pump 32 and preferably controls coolant pump 32 so that its speed is a function of fuel flow to the engine. Control unit 50 supplies a control signal to fan motor 26 so that fan motor 26 is controlled as a function of coolant temperature. Control unit 50 receives a coolant temperature signal from coolant temperature sensor 52 and an oil temperature signal from oil pressure sensor 54. Control unit 50 may also supply controlled 42 volt electrical power to an electric oil pump 56. Control unit 50 may also supply a control signal to control the vanes (not shown) of exhaust turbine 15.

Control units 22 and 50 may also supply electrical power to various other electrical components (not shown). The control signal supplied to actuator 19 may also be controlled as a function of sensed parameters, such as engine temperature sensed by a sensor 52. Preferably, the control unit 50 controls the speed of fan motor 26 and/or pump 32 as a function of sensed coolant temperature and the output of the engine 10. Since the generator output is related to engine output, the pump 32 can be controlled to increase its output as engine output increases.

Figure 2:
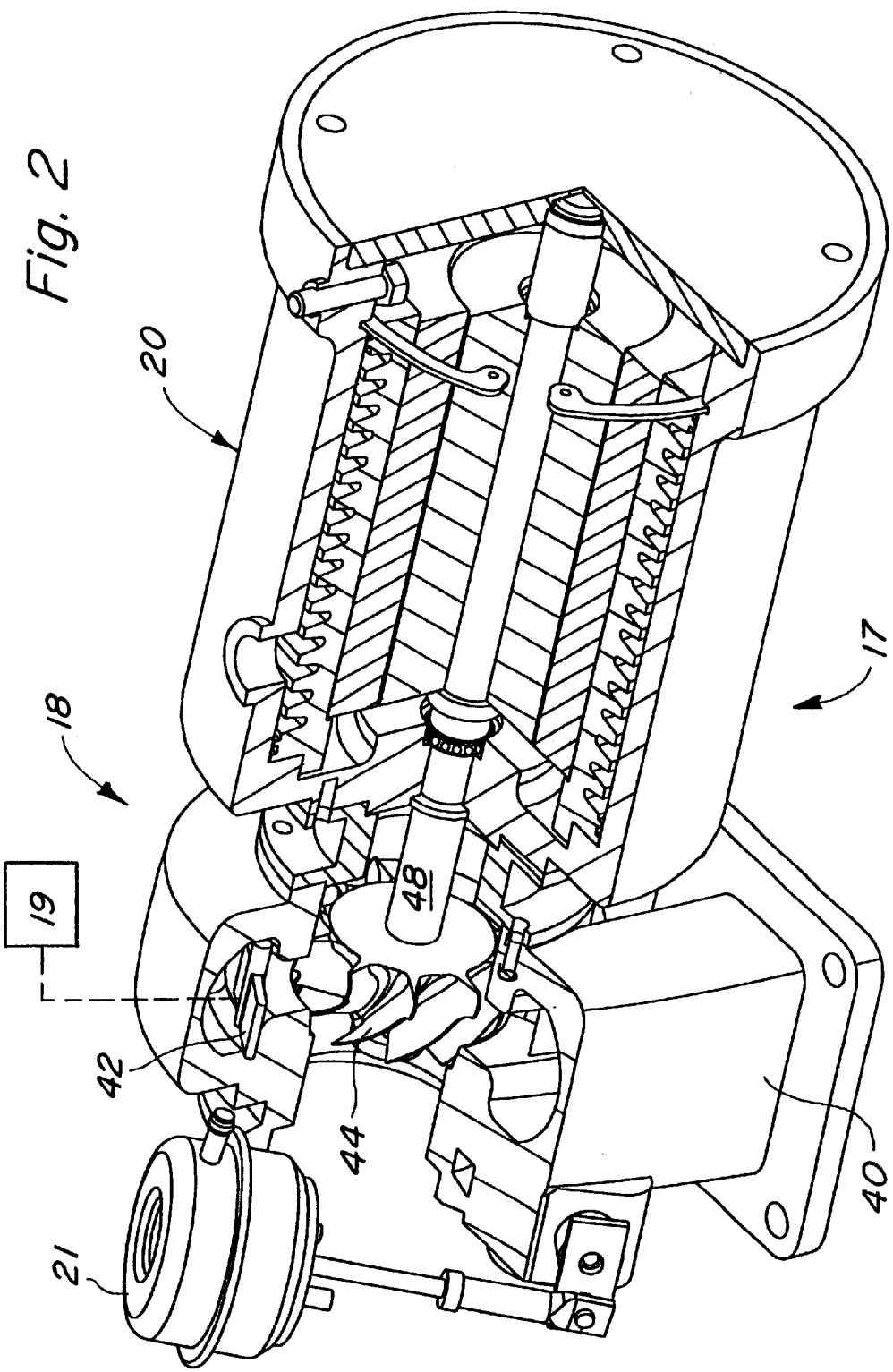
FIG. 2 is a perspective partial cut-away view of the variable geometry turbo-generator of FIG. 1.

Referring now to FIG. 2, turbo-generator unit 17 includes a variable geometry turbine 18, such as a micro-turbine made by Honeywell or Capstone, which receives exhaust gasses from turbine 15, and an electrical generator 20. Turbine 18 has an inlet 40 which is connected to the outlet of exhaust turbine 15, and adjustable vanes 42, such as in adjustable vane units manufactured by Honeywell or Garrett, which adjust the flow of exhaust gasses to turbine blades 44 in response to control signals applied to actuator 19. Turbine 18 drives generator 20 through shaft 48.

Preferably, the controller 22 controls the turbo-generator unit 17 as a function of inputs from engine controller 50 in order to optimize overall efficiency. For example, controller 22 will preferably activate the turbo-generator unit 17 only when sufficient energy is available in the exhaust gases. Controller 22 will preferably activate both the turbo-generator unit 17 and the motor generator 11 when the turbo-generator unit 17 alone cannot supply the demanded electrical energy. The controller 22 can determine the speed of the generator 20, for purposes of speed control, by analyzing the frequency of the output of the generator 20. The control unit 22 can also adjust the position of the turbine vanes 42 to control and optimize turbine output based on a predetermined stored "map" and control strategy.

While the present invention has been described in conjunction with a specific embodiment, it is understood that many alternatives, modifications and variations will be apparent to those skilled in the art in light of the foregoing description. The turbine powered generator unit may act in conjunction with a crankshaft driven alternator, and may be controlled by a common control system. Electrical output from the generator can power cooling related loads. Also, available power could be used for loads such as battery charging, lighting and cab comfort. Accordingly, this invention is intended to embrace all such alternatives, modifications and variations which fall within the spirit and scope of the appended claims.

Assignment

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A. together with all rights to file, and to claim priorities in connection with, corresponding patent applications in any and all foreign countries in the name of Deere & Company or otherwise.

I claim:

1. An energy recovery system for an internal combustion engine, comprising:
   a first stage turbine driven by exhaust gasses from the engine;
   a second stage turbine driven by exhaust gasses from the first stage turbine;
   an electrical generator driven by the second stage turbine;
   an engine cooling device driven by an electric cooling device motor; and
   a control unit for receiving electrical power from the generator and supplying electrical power to the cooling device motor.

2. The energy recovery system of claim 1, wherein:
   the cooling device comprises an engine cooling fan for blowing air through a radiator.

3. The energy recovery system of claim 1, wherein:
   the cooling device comprises an engine coolant pump driven by an electrical pump motor for circulating coolant through the engine and a radiator.

4. The energy recovery system of claim 3, wherein:
   the control unit supplies electrical power to the pump motor and controls pump motor speed as a function of engine output.

5. The energy recovery system of claim 4, further comprising:
   a coolant temperature sensor which provides a coolant temperature signal to the control unit, the control unit controlling the pump motor as a function of sensed coolant temperature.

6. The energy recovery system of claim 1, wherein:
   the second stage turbine comprises a variable geometry turbine.

7. The energy recovery system of claim 1, wherein:
   the control unit provides electrical power at high and low voltages.

8. The energy recovery system of claim 1, wherein:
   the first stage turbine drives an intake air compressor.

9. The energy recovery system of claim 1, wherein:
   the second stage turbine includes a wastegate controlled by an actuator which is controlled by the control unit.

10. An energy recovery system for an internal combustion engine, comprising:
    a turbocharger unit having an intake air compressor driven by a first stage turbine receiving exhaust from the engine;
    a second stage turbine driven by the exhaust gasses from the first stage turbine;
    an electrical generator driven by the second stage turbine;
    an engine coolant pump driven by an electric pump motor; and
    a control unit for receiving electrical power from the generator and supplying electrical power to the pump motor.

11. The energy recovery system of claim 10, further comprising:
    an engine cooling fan driven by an electrical fan motor for blowing air through a radiator.

12. The energy recovery system of claim 10, wherein:
    the control unit supplies electrical power to the pump motor and controls pump motor speed as a function of engine output.

13. The energy recovery system of claim 11, further comprising:
    a coolant temperature sensor which provides a coolant temperature signal to the control unit, the control unit controlling the fan motor as a function of sensed coolant temperature.

14. The energy recovery system of claim 10, wherein:
    the second stage turbine comprises a variable geometry turbine.

15. The energy recovery system of claim 10, wherein:
    the control unit provides electrical power at high and low voltages.

16. The energy recovery system of claim 10, wherein:
    the second stage turbine includes a wastegate controlled by an actuator which is controlled by the control unit.

* * * * *